United States Patent Office 2,816,106
Patented Dec. 10, 1957

2,816,106

METHOD OF HYDROLYZING BUTYRIC ACID ESTERS OF CELLULOSE

Carl J. Malm, Leo J. Tanghe, and Harriett M. Herzog, Rochester, N. Y., assignors to Eastman Kodak Company, Rochester, N. Y., a corporation of New Jersey No Drawing. Application August 20, 1954, Serial No. 451,312

8 Claims. (Cl. 260—230)

This invention relates to a method of hydrolyzing butyric acid esters of cellulose in which the cellulose ester to be hydrolyzed is treated with an alkaline material while in solution in a mixture of acetone, methanol and water. This invention relates to the hydrolysis of cellulose esters of either normal or isobutyric acid.

Often, in the hydrolysis of butyric acid esters of cellulose, the resistance of the butyryl groups thereof to the hydrolyzing action of water introduces difficulties. In some cases, an attempt to hydrolyze those esters results in breakdown of their viscosity. In the preparation of the isobutyric acid esters of cellulose, processes using zinc chloride as the catalyst have been found to be the most satisfactory, such as of the type described and claimed in U. S. applications Serial Nos. 435,041 and 435,042 of Malm and Blanchard, filed June 7, 1954. The hydrolysis of the esters thus prepared while in the esterification solution may present difficulties due both to the stability of the isobutyryl groups towards hydrolysis and the degrading effect of zinc chloride on cellulose under many hydrolysis conditions. Our invention relates to the hydrolysis of butyric acid esters of cellulose having a butyryl content of at least 20%. Although esters of that type even when substantially fully esterified are acetone soluble, it is ordinarily desirable to hydrolyze those esters to obtain certain desirable properties in the use of those esters for plastic purposes.

One object of our invention is to provide a method for hydrolyzing butyric acid esters of cellulose in solution in acetone-methanol-water. Another object of our invention is to provide a method for hydrolyzing butyric acid esters of cellulose in which little, if any, breakdown of viscosity results from the hydrolysis process. A still further object of our invention is to provide a convenient and time-saving method for hydrolyzing butyric acid esters of cellulose. Other objects of our invention will appear herein.

We have found that butyric acid esters of cellulose, either normal butyrates or isobutyrates, having a butyryl content of at least 20% may be readily hydrolyzed to improve the physical properties thereof by treating the cellulose ester while in solution in a mixture of acetone, methanol and water with an alkaline material whereby acyl groups are removed from the cellulose ester and hydroxyl groups are substituted therefor. The hydrolysis process with which we are particularly concerned removes acyl groups from the cellulose ester until the cellulose ester contains 0.5-7% hydroxyl content by weight.

Ordinarily, the hydrolysis process is carried out by dissolving the butyric acid ester of cellulose in solid form, which ester has been obtained in a conventional cellulose butyration process or in a process such as described in the Malm and Blanchard applications referred to above in a mixture of acetone and methanol, this mixture being limited as to the amount of alcohol only by the criterion that solubility of the cellulose ester therein is retained. This acetone-methanol mixture may be within the range of 90:10 to 35:65 acetone to methanol, although the latter ratio may vary depending on the solubility characteristics of the particular cellulose butyric ester which is to be dissolved. We have found that proportions of acetone to methanol within the range of 80:20 to 50:50 are very satisfactory for use in processes in accordance with our invention.

Water is also incorporated in the cellulose ester solution, the upper limit of the amount of water added being governed by the solubility of the cellulose ester, being short of that which will cause insolubility of the cellulose ester in the solvent mixture. Preferably the amount of water used is within the range of 5–10% based on the acetone-methanol mixture. The use of too little water in the hydrolysis mass will result in a cellulose ester having poor uniformity.

There is also added to the mass a small amount of an alkaline material, which material may be an alkali metal hydroxide or carbonate, or a trialkali metal phosphate or some other salt having an alkaline reaction. The cellulose ester in solution in this mass is hydrolyzed, as by allowing it to stand for a few hours, the hydrolysis terminating either as a result of consumption of the alkaline material used or by the addition of a neutralizing acid such as sulfuric, hydrochloric or acetic acid after the hydrolysis has been carried out for the desired time. The hydrolysis is preferably carried out at normal or room temperature as with elevation of temperature even though hydrolysis of the cellulose ester is accelerated, the degree of hydrolysis thereof is ultimately not as great as that obtained using normal or below normal temperatures.

The amount of alkaline material added to the mass will vary depending on the composition of the solvent mixture and the particular alkaline material employed. For instance, with materials which are more strongly alkaline, such as sodium hydroxide and potassium hydroxide less quantities are used than with other alkaline materials such as trisodium phosphate or sodium carbonate, the latter being used in amounts 5–10 times that of sodium hydroxide to accomplish the same degree of hydrolysis. In view of the more manageable nature of trisodium phosphate or the like, the use of that type of alkaline material is preferred to the more strongly alkaline materials.

As the acetone-methanol ratio decreases, less alkaline material is usually necessary to give a product of a selected hydroxyl content. For instance, in some cases hydrolysis may be accomplished with the use of as little as .1% sodium hydroxide based on the amount of cellulose ester, such as in situations where a large proportion of methanol is supplied. In other cases in which the amount of methanol is not as great, larger quantities of caustic alkali may be desired, such as up to .5% or even more although it is ordinarily preferred not to employ more than 5% caustic alkali based on the weight of the cellulose ester. Instead of increasing the alkali amount, it is usually more desirable to increase the ratio of alcohol to acetone with a given amount of alkali. The following examples illustrate hydrolysis processes in accordance with our invention.

*Example 1*

One part of a cellulose acetate isobutyrate containing 20.4% acetyl and 30.4% isobutyryl was dissolved in 15 parts of acetone-methanol and 9% water was added, based on the amount of acetone-methanol. 10% aqueous sodium hydroxide was added and the hydrolysis mass was allowed to stand at room temperature for approximately 1 hour. The proportions used in 3 runs of this type and the hydroxyl contents of each of the resulting products were as follows:

| Ml 10% NaOH Per 100 g. ester | Ratio, Acetone: Methanol | Percent OH |
|---|---|---|
| 1.67 | 4:1 | 0.95 |
| 5.0 | 4:1 | 3.3 |
| 5.0 | 1:1 | 6.4 |

*Example 2*

One part of a cellulose acetate normal butyrate triester containing approximately 45% normal butyryl was dissolved in 15 parts of acetone-methanol (4:1) and 10% water was added, based on the acetone-methanol. 10% aqueous sodium hydroxide was added as indicated in the following table and hydrolysis was allowed to continue at room temperature for 1 hour or more. The hydroxyl contents obtained in each of the various runs as indicated below were as follows:

| Ml. 10% NaOH per 100 g. ester | Percent OH |
|---|---|
| Starting material | 0.1 |
| 1.7 | 0.73 |
| 3.3 | 1.85 |
| 5.0 | 3.0 |
| 6.7 | 4.1 |

*Example 3*

One part of a cellulose acetate isobutyrate triester having an isobutyryl content of 38% was dissolved in 15 parts of acetone-methanol (1:1) and 5% of water was added to the solvent. Trisodium phosphate was added in amounts given in the following table and hydrolysis was allowed to proceed at room temperature for the times indicated. The hydroxyl contents obtained were as shown:

| Ml. 10% Na₃PO₄ per 100 g. ester | Time, hours | Percent OH |
|---|---|---|
| 12.5 | 1 | 0.56 |
| 12.5 | 4 | 1.44 |
| 25 | 1 | 1.30 |
| 25 | 4 | 3.1 |
| 37.5 | 1 | 2.00 |
| 37.5 | 4 | 3.4 |
| 50 | 1 | 2.44 |
| 50 | 4 | 4.5 |

Our hydrolysis process is adapted to the hydrolysis of butyric esters of cellulose, having a butyryl content of at least 20%, both simple and mixed, n-butyrates and iso-butyrates. Regardless of the type of ester employed, the hydrolysis is carried out by permitting a solution of the ester in acetone-methanol-water containing alkaline material to remain for a time sufficient to give the hydroxyl content desired as described herein.

We claim:

1. A method of hydrolyzing a butyric acid ester of cellulose containing at least 20% of butyryl which comprises allowing the cellulose ester in solution in a solvent mixture therefor of acetone, methanol, water and an alkali metal compound having basic character to stand for a time sufficient to impart a hydroxyl content to the ester of 0.5–7% hydroxyl by weight.

2. A method of hydrolyzing an isobutyric acid ester of cellulose which ester contains at least 20% butyryl which comprises allowing the cellulose ester to stand in its solution in acetone, methanol, water and alkali metal compound having basic character for a sufficient time that there is imparted thereto a hydroxyl content of 0.5–7% hydroxyl by weight.

3. A method of hydrolyzing a normal butyric acid ester of cellulose having a butyryl content of at least 20% which comprises allowing the cellulose ester to stand while in solution in a solvent mixture therefor of acetone, methanol, water and alkali metal compound having basic character until there is imparted to the cellulose ester a hydroxyl content of 0.5–7% hydroxyl by weight.

4. A method of hydrolyzing a butyric acid ester of cellulose containing at least 20% butyryl which comprises dissolving the cellulose ester in acetone-methanol, 90:10 to 35:65, adding 5–10% of water based on the acetone-methanol mixture to the solution in an amount short of that which will cause insolubility of the cellulose ester and an alkali metal compound having basic character in an amount sufficient to cause hydrolysis of the cellulose ester and allowing the mass to stand until there is imparted to the cellulose ester a hydroxyl content within the range of 0.5–7% hydroxyl by weight.

5. A method of hydrolyzing a cellulose acetate isobutyrate containing at least 20% isobutyryl which comprises dissolving the cellulose ester in acetone-methanol (4:1), adding water and trisodium phosphate to the mass and permitting the mass to stand until there is imparted to the cellulose ester 0.5–7% of hydroxyl by weight.

6. A method of hydrolyzing a cellulose acetate isobutyrate containing at least 20% isobutyryl which comprises dissolving the cellulose ester in acetone-methanol (4:1), adding water and sodium hydroxide to the mass and permitting the mass to stand until there is imparted to the cellulose ester 0.5–7% of hydroxyl by weight.

7. A method of hydrolyzing a cellulose acetate normal butyrate containing at least 20% of butyryl which comprises dissolving the ester in acetone-methanol (4:1), adding water and alkali metal compound having basic character to the mass and allowing it to stand until there is imparted to the cellulose ester a hydroxyl content within the range of 0.5–7% hydroxyl by weight.

8. A method of hydrolyzing butyric acid esters of cellulose having a butyryl content of at least 20% which comprises forming a solution of the cellulose ester in a mixture of acetone, methanol, water and alkali metal compound having basic character, the acetone-methanol being within the range of 80:20 to 50:50, the water being within the range of 5–10% based on the acetone-methanol mixture and the alkali metal compound being sufficient to cause hydrolysis of the cellulose ester and permitting the solution to stand for a sufficient time that a hydroxyl content within the range of 0.5–7% by weight is imparted to the cellulose ester.

References Cited in the file of this patent

UNITED STATES PATENTS

| 1,993,782 | Haney | Mar. 12, 1935 |
| 2,000,620 | Staud et al. | May 7, 1935 |
| 2,327,770 | Crane | Aug. 24, 1943 |
| 2,470,192 | Seymour et al. | May 17, 1949 |
| 2,523,384 | Martin et al. | Sept. 26, 1950 |
| 2,553,664 | Martin et al. | May 22, 1951 |
| 2,614,941 | Hiatt et al. | Oct. 21, 1952 |

FOREIGN PATENTS

| 615,602 | Great Britain | Jan. 7, 1948 |